United States Patent [19]
Callsen

[11] Patent Number: 6,044,379
[45] Date of Patent: Mar. 28, 2000

[54] METHOD AND APPARATUS FOR EFFICIENTLY IMPLEMENTING MULTIPLE STORAGE MECHANISM FOR NAME SERVICES ASSOCIATED WITH A COMPUTER SYSTEM

[75] Inventor: Christian J. Callsen, Redwood City, Calif.

[73] Assignee: Sun Microsystems, Inc., Palo Alto, Calif.

[21] Appl. No.: 08/993,635

[22] Filed: Dec. 18, 1997

[51] Int. Cl.[7] ...................................................... G06F 17/30
[52] U.S. Cl. ............................ 707/103; 707/10; 709/203; 709/303
[58] Field of Search ............................ 707/103, 10, 100, 707/101; 395/702, 200.33; 709/203, 303

[56] References Cited

U.S. PATENT DOCUMENTS

| | | | |
|---|---|---|---|
| 5,873,092 | 2/1999 | Cheng et al. ............................ | 707/103 |
| 5,878,260 | 3/1999 | Copeland et al. ...................... | 395/702 |
| 5,893,107 | 4/1999 | Chan et al. ............................. | 707/103 |

*Primary Examiner*—Hosain T. Alam
*Attorney, Agent, or Firm*—Beyer & Weaver, LLP

[57] ABSTRACT

Methods and apparatus for implementing both transient and persistent name services are disclosed. According to one aspect of the present invention, a name service may be arranged to store and process both transient and persistent information. The implementation of at least one storage mechanism arranged to store persistent information for such name service includes creating a recursive section of a hierarchical name space structure. The recursive section of the name space structure is arranged to process both the transient information and the persistent information. Implementing the name service also includes creating a local section of the name space structure. The local section includes an implementation that embodies the storage mechanism, which is encapsulated in a data store interface, that is arranged to store the persistent information.

27 Claims, 11 Drawing Sheets

METHOD AND APPARATUS FOR EFFICIENTLY IMPLEMENTING MULTIPLE STORAGE MECHANISM FOR NAME SERVICES ASSOCIATED WITH A COMPUTER SYSTEM

BACKGROUND OF THE INVENTION

1. Field of Invention

The invention relates generally to methods and apparatuses for implementing name services in distributed object systems. More particularly, the invention relates to methods and apparatuses for efficiently enabling both persistent and transient name services to be implemented within a distributed object system.

2. Description of Relevant Art

Name services are often implemented within distributed object systems to enable distributed objects to be readily identified. One type of a distributed object system which uses name services includes a distributed object system that is defined under the Common Object Request Broker Architecture (CORBA) specification. Distributed object systems which use name services may be in the context of an Object Request Broker (ORB) implemented under the CORBA specification from the OMG, Revision 2.0, dated July 1995, and updated July 1996, which is incorporated herein by reference in its entirety. Specifically, the "CosNaming" module of the CORBA Services specification, as specified in the CORBA specification from the OMG, may be used to implement name services.

A name service, which may be associated with a name server, is typically arranged such that when provided with a name, the name service associates the name with "something," e.g., an object, an object reference, or a property. The association of the name with an object, for example, may either be transient or persistent. For a transient name service, the association between a name and an object generally disappears once the program which uses the association between the name and the object terminates. Alternatively, for a persistent name service, the association between a name and an object is stored in a data file, and does not disappear once the program which associates the name with the object terminates. In general, the implementation of a name service often includes the implementation of a data structure such as a table to hold bindings between names and object references and, in some cases, properties. Such a data structure, in other words, may be used to associate names with object references, as well as properties.

FIG. 1 is a diagrammatic representation of an implementation of a name service in accordance with prior art. An implementation of a name service 100 includes a "main" table 104. Although main table 104 may take on a variety of different configurations, main table 104 is typically a look-up table, or a list, which associates names 108 in a name column 112 of main table 104 with pointers 116 in a pointer column 120 of main table 104. Pointers 116 in pointer column 120 identify, or reference, objects 124 which are associated with names 108. By way of example, name "X" 108a is associated with pointer "$x_p$" 116a, which is a pointer to object 124a. As such, pointer "$x_p$" 116a is essentially an object reference which identifies object 124a. Similarly, name "Y" 108b is associated with pointer "$y_p$" 116b, which is a pointer to object 124b which, as shown, is a secondary list. Object 124b includes references to other objects, such as an object 128 which may also be a list. Object 124b may also include a reference 132 to main table 104.

The use of name service 100 enables a name, such as name "X" 108a, to be remembered, instead of pointer "$x_p$" 116a, when access to object 124a is desired. By using a name as an index into main table 104 to identify an object, the overhead, and, hence, the complexity associated with locating objects can be reduced.

A look-up table which is included as a part of a name service, may either be transient or persistent. For a transient name service, local look-up tables, i.e., look-up tables which were created locally during a process, are temporarily stored in volatile memory, and are not stored into a file. As such, when a program which implements the local look-up tables terminates, the local look-up tables, in addition to information contained in local look-up tables, is destroyed. Alternatively, for a persistent name service, the local look-up tables are stored into files, as for example files on a non-volatile memory, such as a disk. Hence, data contained in look-up tables associated with a persistent name service is not destroyed when the program which implements the look-up tables is terminated.

A name may generally be expressed as an array of components, such as characters. In other words, although a name may be expressed as "abcd," when a name is to be processed, e.g., bound or resolved, the name is typically processed as an array of components [a, b, c, d]. When the name "abcd" is being "looked up," or resolved, using a name service, the components of the name are looked up sequentially. The first component of the name, i.e., "a," is resolved first, while the last component of the name, i.e., "d," is resolved last. FIG. 2 is a diagrammatic representation of a name service implementation which includes multiple look-up tables which may be used to identify a pointer to an object that is associated with and, hence, may be identified by name "abcd." A name service implementation 200 includes a main look-up table 204 which is used to associate a pointer "$a_p$" 208 with a first component "a" of name "abcd."

Pointer "$a_p$" 208 identifies a second look-up table 212 in which a second component "b" of name "abcd" may be found. Second component "b" is associated with a pointer "$b_p$" 216 which identifies a third look-up table 220. Third look-up table 220 is used to find a third component "c" of name "abcd," which is associated with a pointer "$c_p$" 224 that references a final look-up table 228. As shown, final look-up table 228 is the last in a chain of look-up tables associated with name service implementation 200. However, as will be appreciated by those skilled in the art, the number of look-up tables associated with a name is often dependent upon the number of components in the name.

Final look-up table 228 associates, e.g., binds, component "d" of name "abcd" with a pointer $O_{ptr}$ 232. In other words, when name "abcd" is traversed until only component "d" remains, component "d" may then be bound to pointer $O_{ptr}$ 232 which references an object 236 which is associated with the overall name "abcd." When name service 200 stores look-up tables, either in volatile memory or in non-volatile memory, tables 204, 212, 220, and 228 are all stored. As will be appreciated by those skilled in the art, typically, either all or none of tables 204, 212, 220, and 228 are stored. When all tables are stored, by way of example, table 228 is either temporarily stored in volatile memory, such that table 228 is destroyed when the program that implements name service implementation 200 terminates, or table 228 is written into a file on a disk. In other words, for a transient name service, table 228 is stored in volatile memory, whereas for a persistent name service, table 228 may be stored on a disk. By analogy, tables 204, 212, and 220 are stored in the same manner.

Some name services may also store properties in look-up tables. For example, final look-up table 228 may include references to a property table which contains a property that is associated with name "abcd." A reference "prop" 240 associated with name "abcd" may identify a property table 244 which contains properties and may, in some instances, also include objects.

When look-up tables are stored on a non-volatile memory such as a disk, updating and accessing look-up tables, as for example to "look up" a name, is more complicated than updating and accessing look-up tables which are transiently stored in volatile memory. For instance, a table stored in volatile memory and its associated "image" on a non-volatile memory must be kept synchronized, i.e., current or up to date, thereby requiring additional logic. As such, the algorithms and code associated with the implementation of a persistent name service may be somewhat different and more involved, than the algorithms and code associated with a transient name service. A persistent name service often includes all the functionality of a transient name service, in addition to algorithms and code that are specifically associated with the storage of look-up tables. Typically, within a system which supports both a transient name service and a persistent name service, the algorithms associated with the transient name service and the algorithms associated with the persistent name service are often implemented as separate code sections.

In general, program code which is used to implement transient name services and persistent name services, within a given system, is relatively extensive. This is often due to the fact that for a system which includes the capability to implement both a transient name service and a persistent name service, the implementation of the transient name service and the implementation of the persistent name service generally involves the use of separate code sections. The use of separate code sections is often undesirable, as the resources used by the separate code sections may be significant. Further, since transient name services and persistent name services often include common functions and perform similar tasks, the use of separate code and different methods for processing transient name services and persistent name services may be inefficient. Therefore, what is desired is an efficient and compact method and apparatus for implementing both a transient name service and a persistent name service. Specifically, what is needed is an efficient method and apparatus for providing the capability to efficiently implement both a transient name service and a persistent name service within a single system.

SUMMARY OF THE INVENTION

Methods and apparatus for implementing both transient and persistent name services are disclosed. According to one aspect of the present invention, a name service may be arranged to store and process both transient and persistent information. The implementation of at least one storage mechanism arranged to store persistent information for such name service includes creating a recursive section of a hierarchical name space structure. The recursive section of the name space structure is arranged to process both the transient information and the persistent information. Implementing the name service also includes creating a local section of the name space structure. The local section includes an implementation that embodies the storage mechanism, which is encapsulated in a data store interface, that is arranged to store the persistent information.

In one embodiment, the local section of the name space structure is also arranged to store the transient information. In such an embodiment, the local section is further arranged to bind a name passed into the name service to a type passed into the name service. Binding the name passed into the name service to the type passed into the name service may involve determining the number of components in the name, and binding the name to the type when it is determined that the name only has a single component. A first component in the name is obtained when it is determined that the name has more than one component. After the first component of the name is resolved, the remaining components of the name are then resolved in order to bind the name to the type.

According to another aspect of the present invention, a method for implementing a name service in an object-based computing system includes providing a context interface that is arranged to implement a class which is arranged to perform data storage. The method further includes providing a storage interface which cooperates with the context interface to implement the class which is arranged to perform the data storage. The class which is arranged to perform the data storage generally allows both transient data and persistent data to be stored. In one embodiment, the storage interface is arranged to encapsulate at least one data store.

In another embodiment, the storage interface includes a resolve operation which is used to resolve a name that is provided to the context interface. When the resolve operation is used to resolve the name, a binding from a data store embodied in the class which is arranged to perform data storage is obtained.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

The implementation of both a transient name service and a persistent name service within an object-based system, such as a distributed object system, generally involves the implementation of completely separate sections of computer code, or software. Since the performance, e.g., efficiency, of a software program is at least partially dependent upon the size of the software program, eliminating computer code whenever possible is often desirable, as will be appreciated by those skilled in the art.

By enabling portions of computer code used to implement a transient name service to be "re-used" in the implementation of a persistent name service, the amount of computer code associated with the implementation of name services may be reduced. In other words, the interfaces and classes associated with name services may be structured such that substantial portions of the interfaces and classes may be applied for use with both a transient name service and a persistent name service. By way of example, a name server may be structured such that the name server includes an interface which is defined with respect to a data store mechanism may facilitate the implementation of both a transient name service and a persistent name service.

Defining an interface which essentially encapsulates the requirements for a storage mechanism in a name server, or service, allows a common code base to be established for the name server. Specifically, a transient name service and a persistent name service may be implemented using the common code base, when an interface is defined to implement a variety of different storage mechanisms, or none at all, as the case may be.

Figure 1:
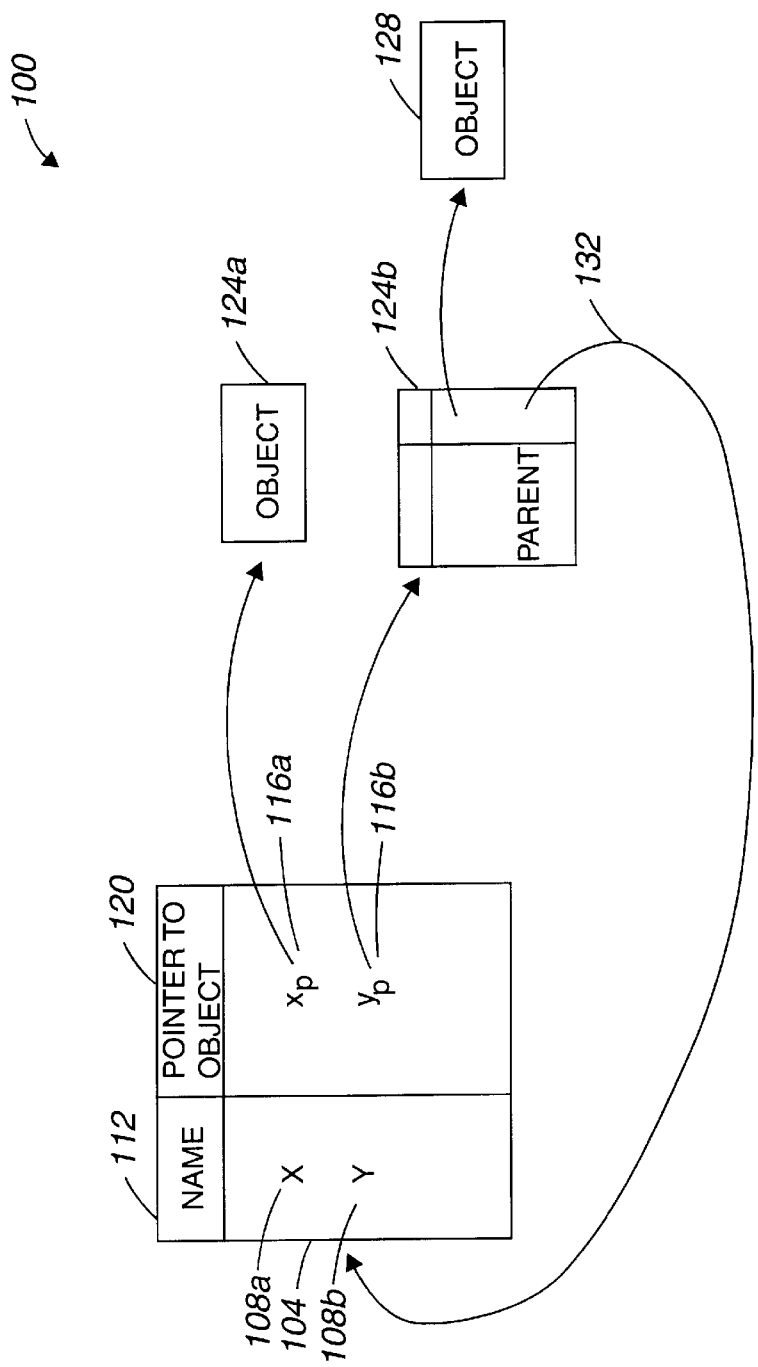
FIG. 1 is a diagrammatic representation of the implementation of a conventional name service.
Figure 2:
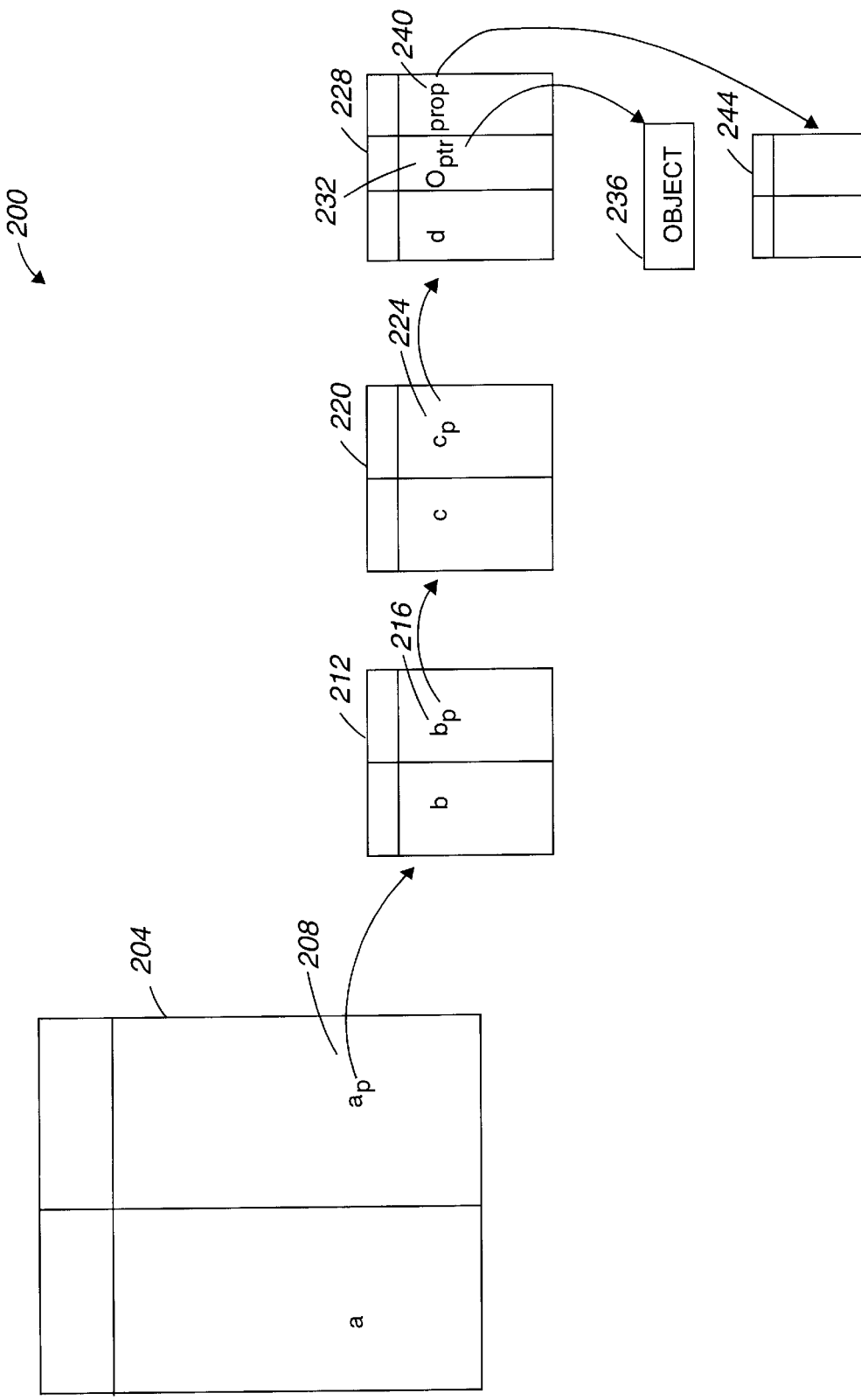
FIG. 2 is a diagrammatic representation of the implementation of a conventional name service which may be used to look up a name "abcd."
Figure 3:
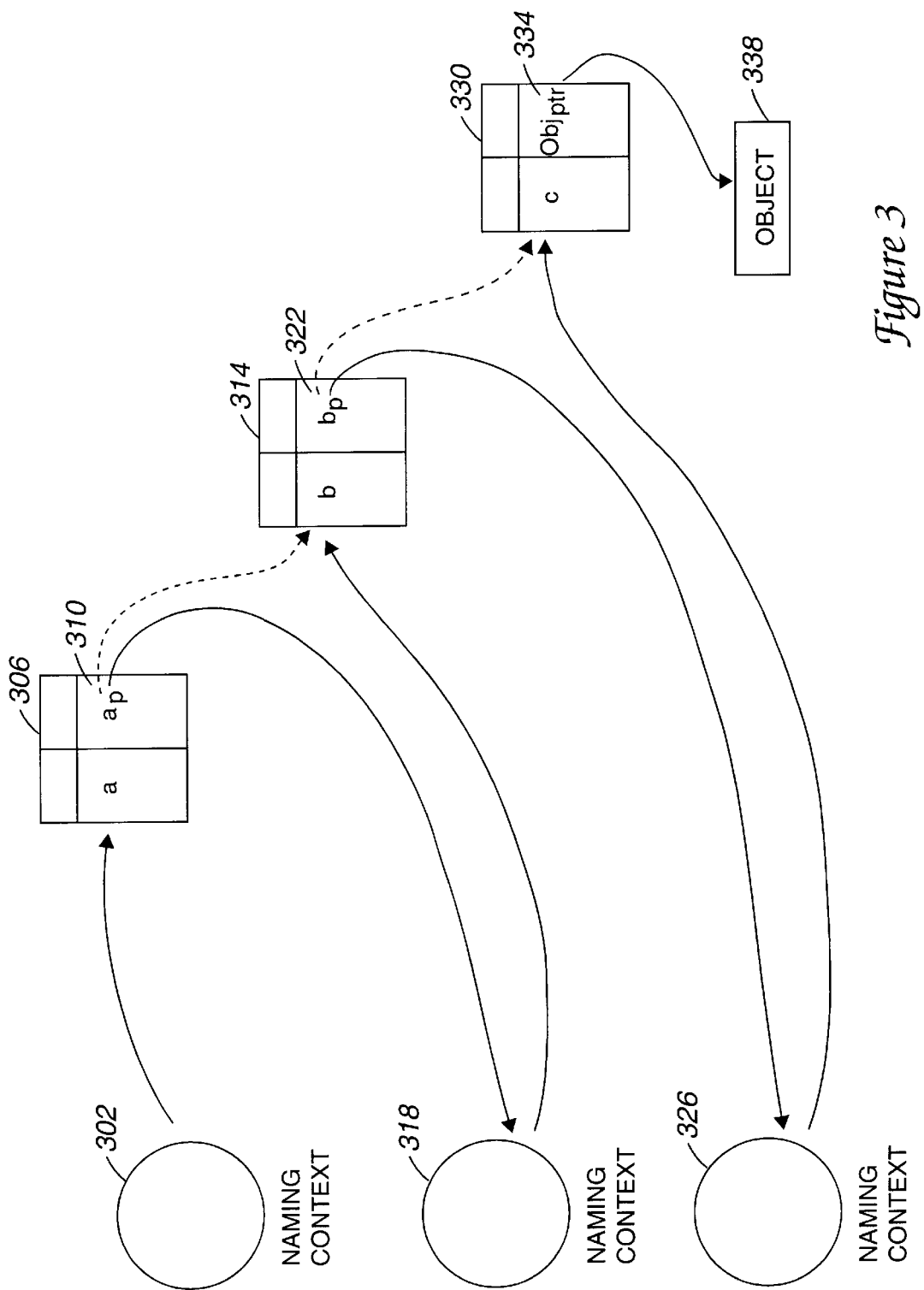
FIG. 3 is a diagrammatic representation of the relationships between look-up tables and naming context objects in accordance with an embodiment of the present invention.

An interface which encapsulates the requirements for a storage mechanism may be defined with respect to naming context objects. FIG. 3 is a diagrammatic representation of the relationships between look-up tables and naming context objects in accordance with an embodiment of the present invention. As shown, the name depicted in FIG. 3 is a name "abc" which may be expressed as an array of components [a, b, c]. A naming context object 302 essentially stores a table of bindings which allows a hierarchical name space structure to be created. That is, the structure of object references associated with naming context object 302 may be traversed by examining the table of bindings substantially recursively for a given object reference. Naming context object 302 includes a pointer to a first look-up table 306 which is used to associate an array component "a" with a pointer "$a_p$" 310. First look-up table 306 may generally be considered to be a table of bindings.

Pointer "$a_p$" 310 identifies a second look-up table 314. However, pointer "$a_p$" 310 does not "directly" reference second look-up table 314. Instead, pointer "$a_p$" 310 references another naming context object 318. Naming context 318 has a pointer to second look-up table 314 which may be used to look up an array component "b." Array component "b" is associated with a pointer "$a_p$" 322 that identifies a third look-up table 330 which is arranged to associate an array component "c" with a pointer 334 to an object 338. That is, third look-up table 330 is substantially the final look-up table associated with name "abc," and contains pointer 334 which identifies object 338, which is bound to name "abc."

As was true for pointer "$a_p$" 310, in the described embodiment, pointer "$b_p$" 322 does not directly reference its associated look-up table, i.e., third look-up table 330. Instead, pointer "$b_p$" 322 references still another naming context 326, which includes a pointer to third look-up table 330.

The use of naming contexts 302, 318, and 326 enables look-up tables 306, 314, and 330, respectively, to be updated through the interface defined by naming contexts 302, 318, and 326. Since the object references that represent naming contexts 302, 318, and 326 may be made available to users, access to look-up tables 306, 314, and 330 are given through naming contexts 302, 318, and 326.

Figure 4:
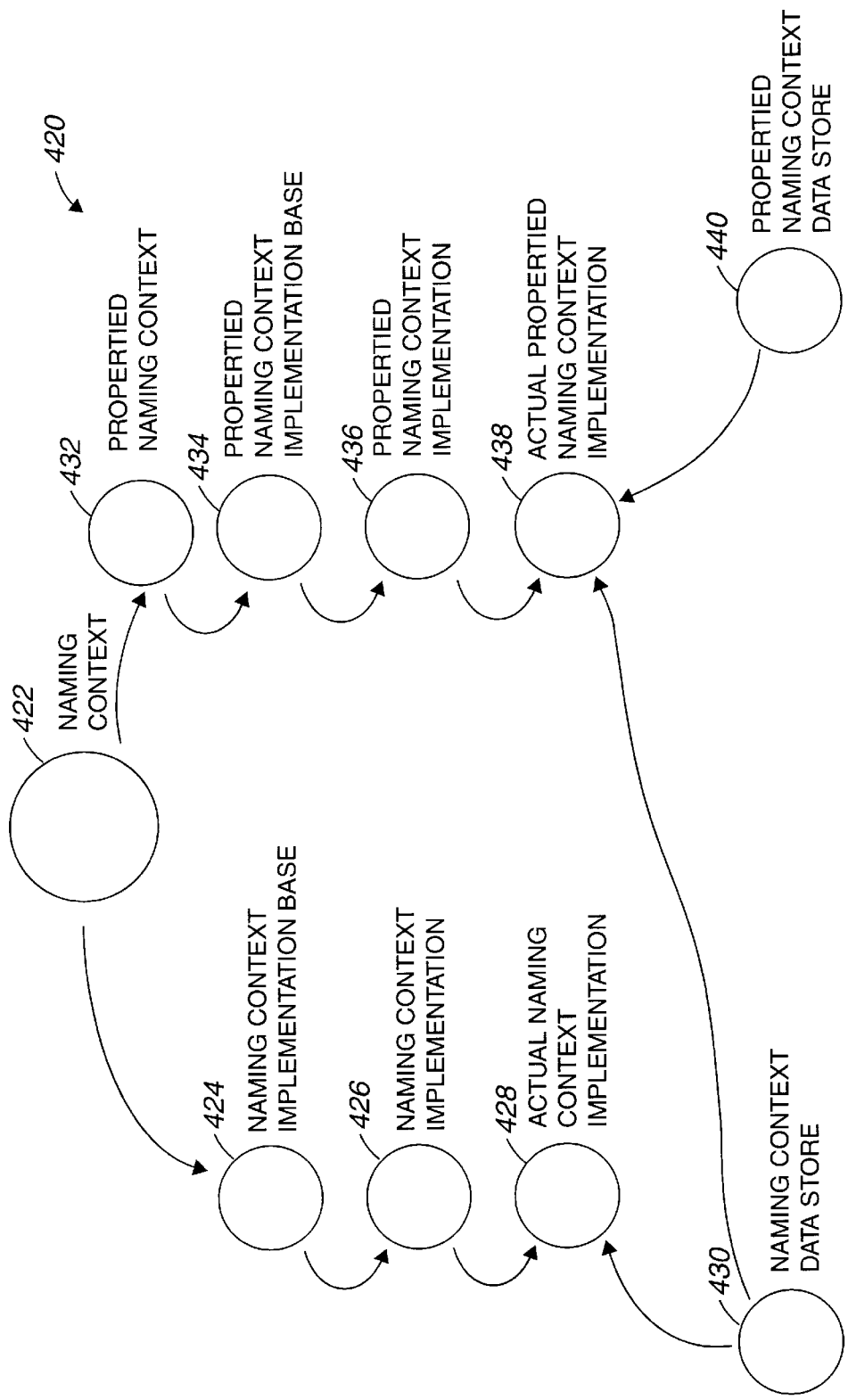
FIG. 4 is a diagrammatic representation of the interfaces and classes associated with the implementation of a naming service in accordance with an embodiment of the present invention.
Figure 5A:
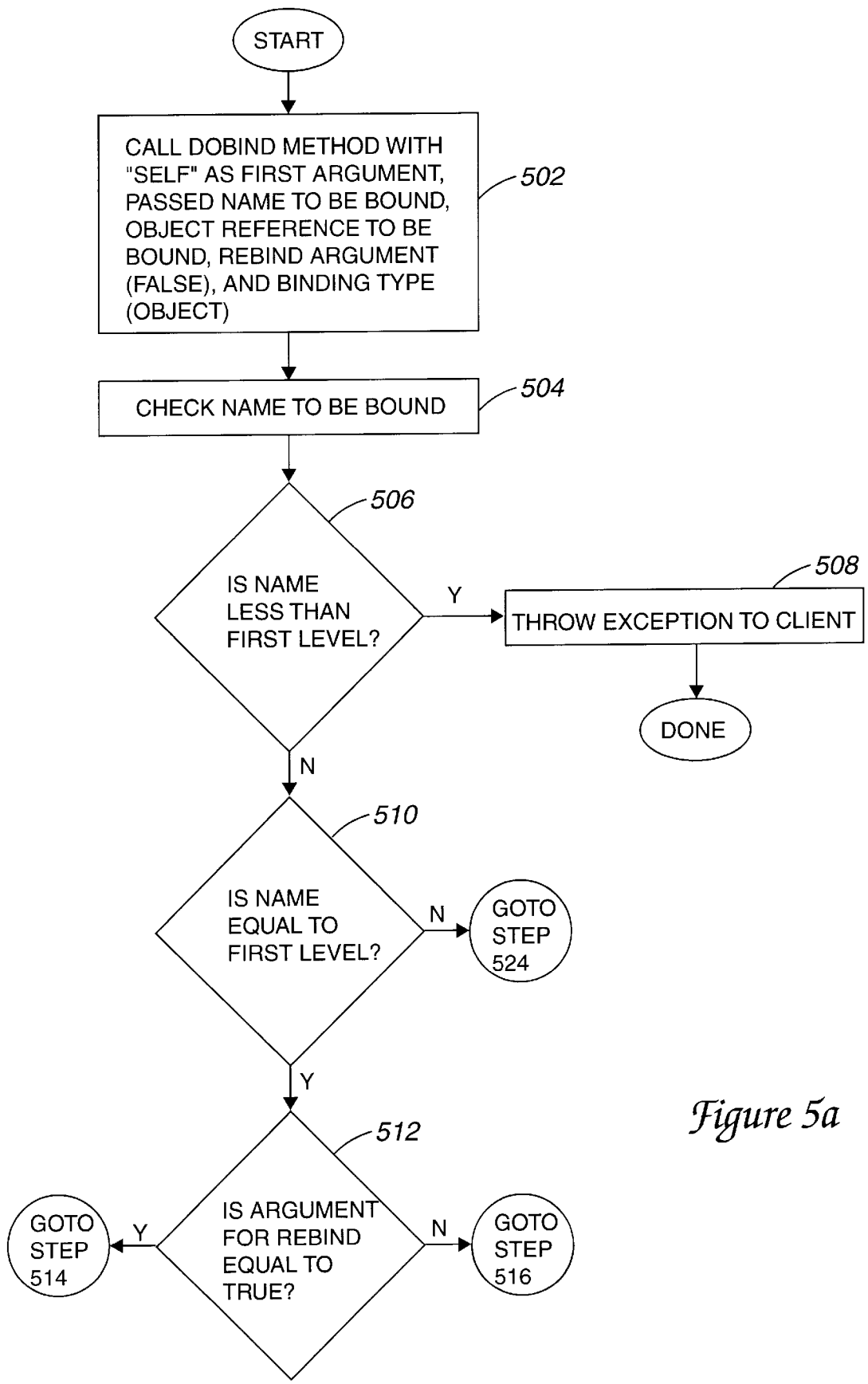
FIGS. 5a–5d are a process flow diagram which illustrates the steps associated with performing a bind operation in accordance with an embodiment of the present invention.
Figure 5B:
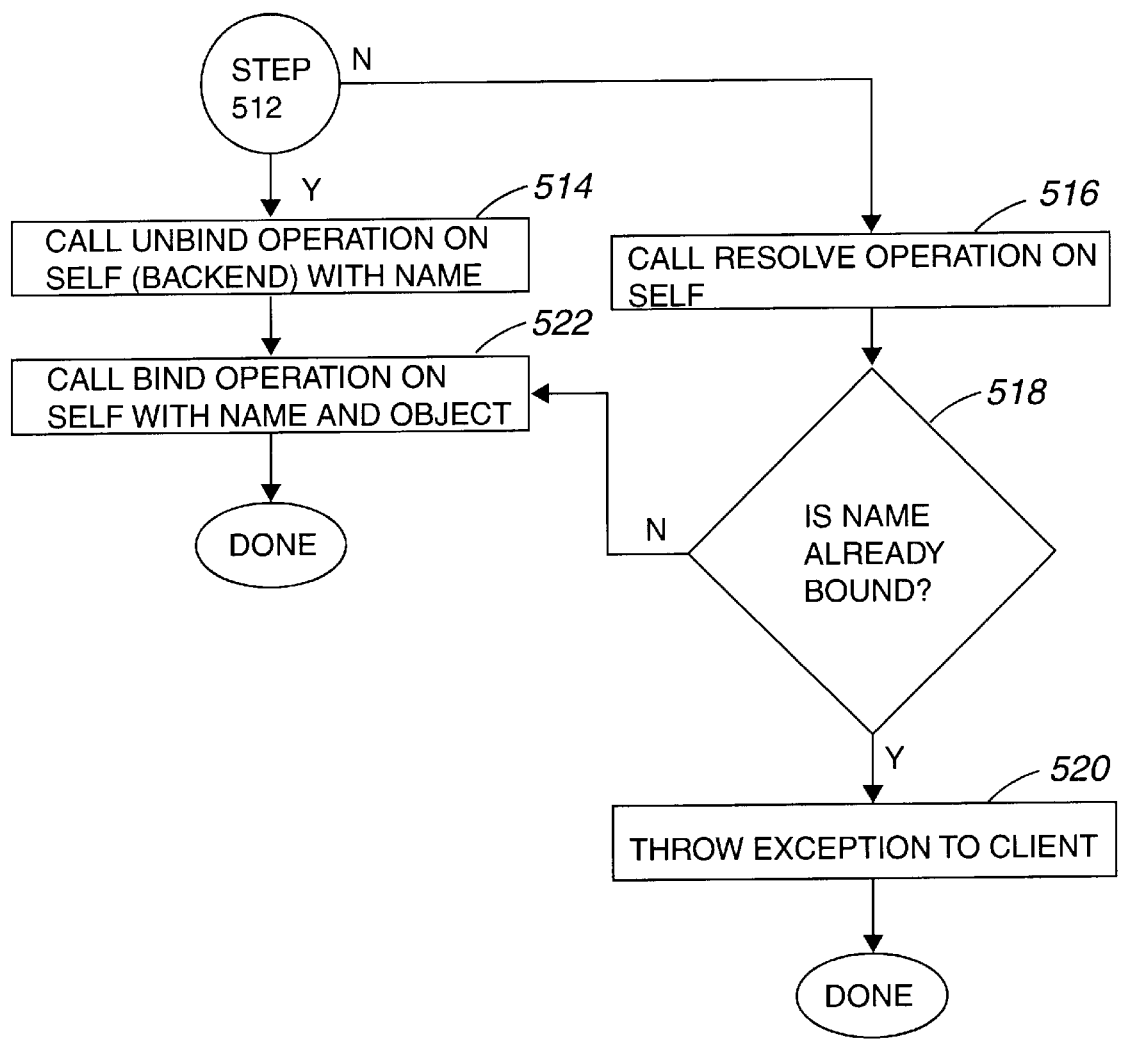
Figure 5C:
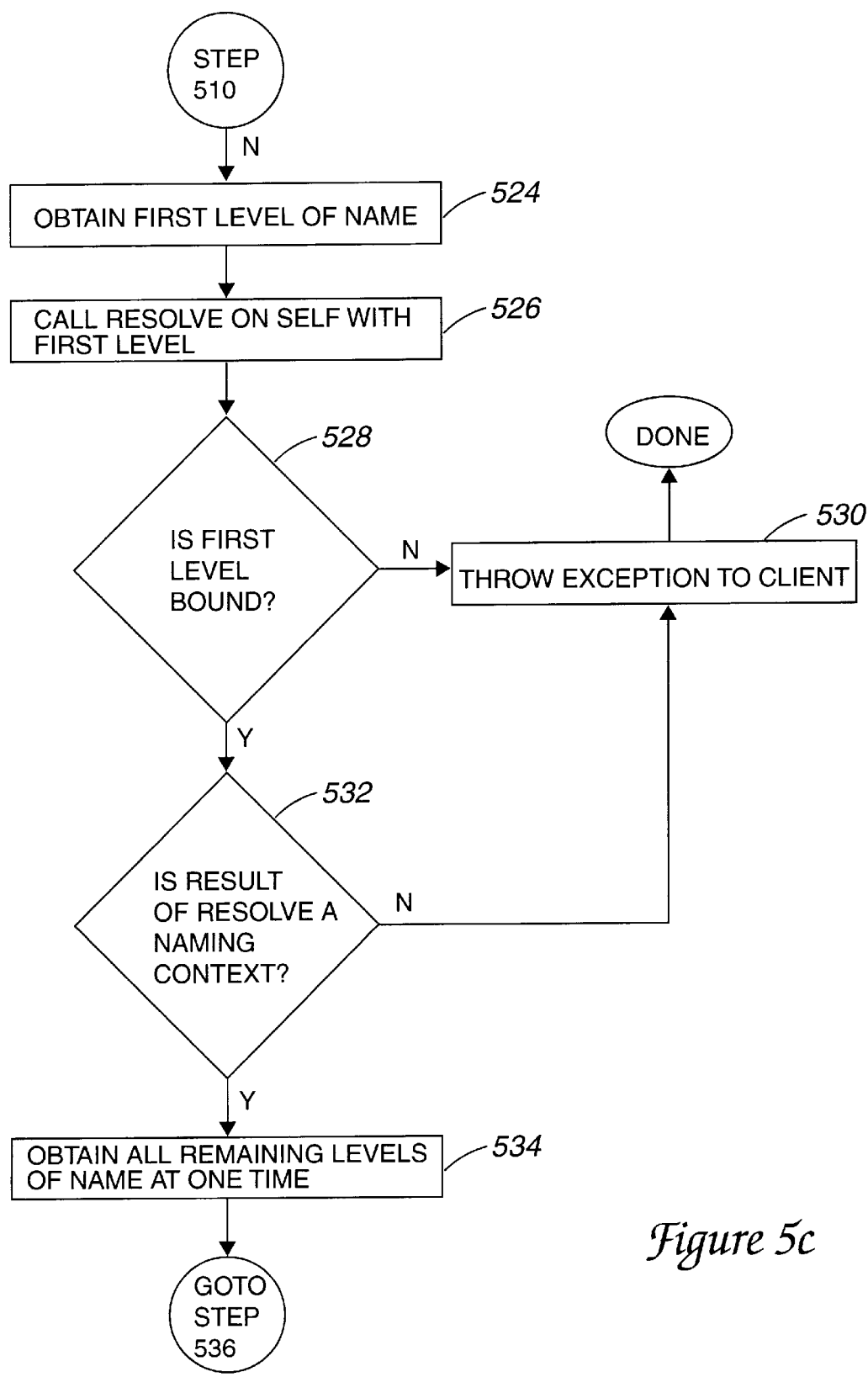
Figure 5D:
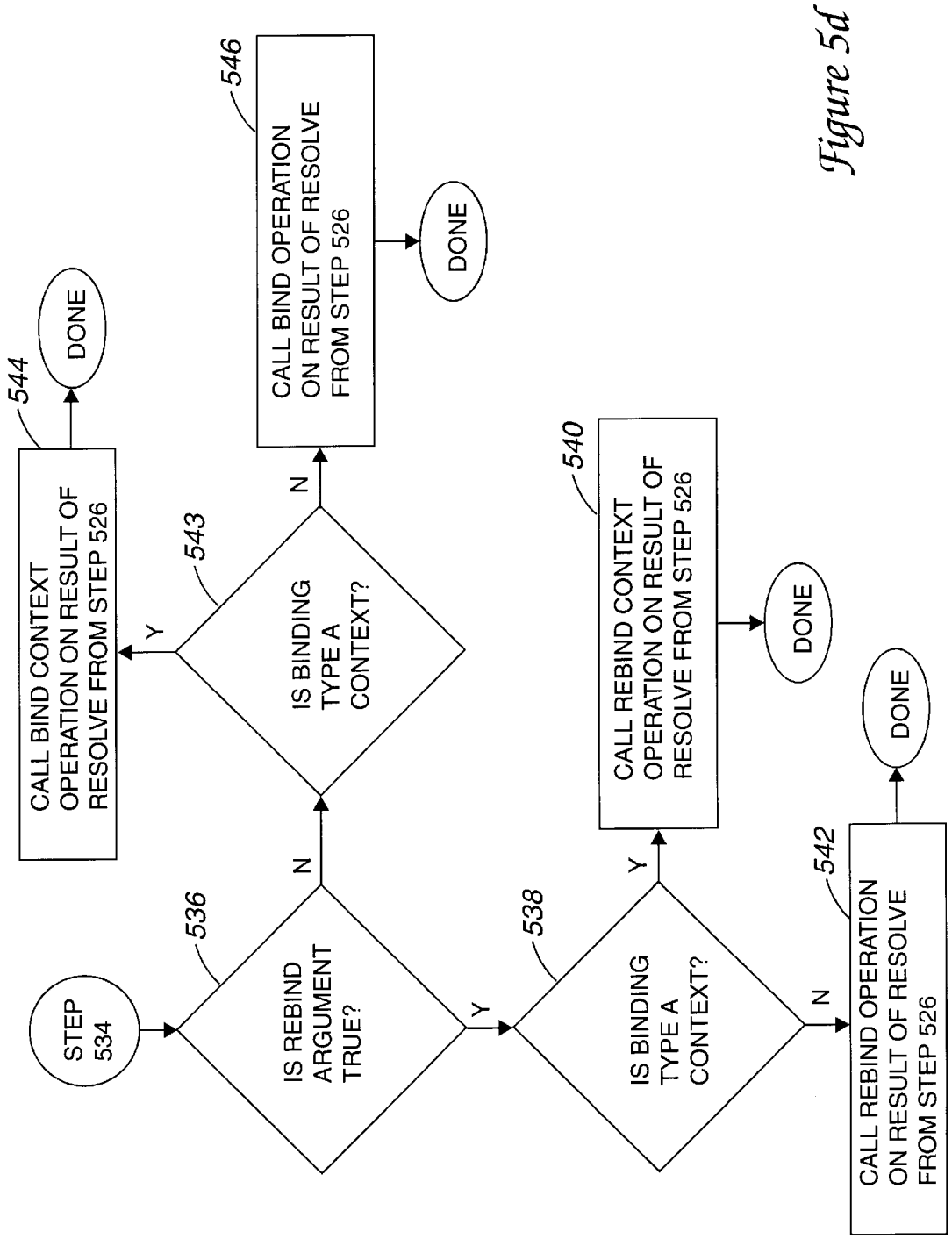

FIG. 4 is a diagrammatic representation of the interfaces and classes associated with the implementation of a name service in accordance with an embodiment of the present invention. A name service 420 includes a naming context 422. Naming context 422 is an interface, e.g., the NamingContext interface from the CosNaming module that is a part of the CORBA Services specification which is incorporated by reference herein. Naming context 422 generally allows a hierarchical name space structure to be created, and is used to implement a naming context implementation base 424. In other words, naming context 422 is arranged to contain a name service. Specifically, a naming context object associated with naming context 422 generally stores a table of bindings which enable the hierarchical name space structure to be created. Such a hierarchical name space structure allows object references to be traversed recursively. Hence, naming context 422 generally allows names with multiple components to be resolved down to the last component of the name, as will be appreciated by those skilled in the art.

In one embodiment, naming context 422 is the mapping of the Naming Context interface of the CosNaming module of the CORBA Services specification. Naming context 422 may be mapped from an interface definition language (IDL) to substantially any suitable programming language using a standard language mapping, as will be appreciated by those skilled in the art. Specifically, naming context 422 may be mapped from an IDL into the Java™ programming language developed by Sun Microsystems, Inc., of Palo Alto, Calif.

Naming context implementation base 424 is a class that implements the interface of naming context 422, as mentioned above. While many naming context implementation bases may be suitable, an example of a suitable naming context implementation base 424 is associated with the org.omg.CosNaming._NamingContextImplBase class from the CosNaming module of the CORBA services specification. Naming context implementation base 424 is arranged to extend naming context interface 422 which is the org.omg.CosNaming.NamingContext interface of the Java™ programming language mapping rubes for the IDL.

Naming context implementation base 424 is extended by a naming context implementation 426, which is the class associated with the actual implementation of a name service. In other words, naming context implementation 426 borrows code from naming context implementation base 424. Typically, naming context implementation 426 performs operations on names and objects to associate, and to disassociate, objects and names as appropriate. By way of example, naming context implementation 426 may call operations or methods which include, but are not limited to, a bind operation, a rebind operation, a resolve operation, an unbind operation, a list operation, a context operation, and a destroy operation. In the described embodiment, the operations or methods associated with naming context implementation 426 are static. In other words, the operations are not associated with any particular object.

A bind operation, as will be described in more detail with respect to FIGS. 5a–5d, is arranged to bind, or otherwise associate, a name with an object. A rebind operation, which is similar to a bind operation, is arranged to reassociate a name with an object. One difference between a bind operation and a rebind operation is that when a bind operation is called on a name which is already bound, an exception will occur.

A resolve operation, which will be described below with respect to FIGS. 6a and 6b, may be used to look up an association between a name in a name service and an object. In other words, the resolve operation may be used to look up a name and, hence, its associated object. An unbind operation is used to delete or remove a name from a name service. When a list operation is called, the list operation provides a list of names associated with a name service. A context operation, as will be appreciated by those skilled in the art, may be used to create a data structure, e.g., a table, associated with a name service. Finally, a destroy operation is arranged to destroy a particular naming context object that contains no entries in the look-up table.

Naming context implementation 426 extends an actual naming context implementation 428. In other words, naming context implementation 426 generally serves as a base class with respect to actual naming context implementation 428. Further, actual naming context implementation 428 inherits from a naming context data store 430 which is associated with an interface that enables bindings, e.g., associations between names and objects, to be stored in storage mechanisms. Specifically, naming context data store 430 is an interface which allows multiple storage mechanisms to be implemented in a name service. Naming context data store 430 essentially encapsulates the requirements for storage mechanisms associated with an implementation of naming context 422. Such storage mechanisms are implemented by actual naming context implementation 428. In other words, actual naming context implementation 428 is essentially the implementation which embodies a selected storage mechanism, specified by naming context data store 430, that is appropriate for a particular name service. For example, for a persistent name service, an appropriate storage mechanism may include a computer disk, whereas for a transient name service, no storage mechanism is needed.

Naming context 422 may also be associated with the implementation of properties. In other words, a naming service associated with naming context 422 may also be associated with binding a property to a name. Naming context 422 is extended by a propertied naming context interface 432, which is an interface that is mapped to an IDL. In one embodiment, propertied naming context 432 is part of an org.omg.ExtendedNaming.PropertiedNamingContext interface, which is an interface that provides extended funtionality.

A propertied naming context implementation base 434 implements propertied naming context interface 432. Propertied naming context implementation base 434 is part of a class that an implementation of a naming context interface, which includes properties, is associated with. Within the described embodiment, propertied naming context implementation base 434 is generally associated with an org.omg.ExtendedNaming.\_ PropertiedNamingContextImplBase class in the Java™ programming language.

Propertied naming context implementation base 434 is implemented by a propertied naming context implementation 436. Propertied naming context implementation 436 is an actual implementation of a name service, i.e., propertied naming context implementation 436 includes operations used directly by a name service. As was the case for naming context implementation 428, propertied naming context implementation 436 may include substantially any appropriate operation. Such operations may include, but are not limited to, a bind operation and a resolve operation.

Propertied naming context implementation 436 is extended by an actual propertied naming context implementation 438. Further, actual propertied naming context implementation 438 implements naming context data store 430, e.g., associations between names and objects, to be stored in storage mechanisms.

In order to enable a common codebase to be created, i.e., in order to allow for as much shared code as possible, in one embodiment, naming context implementation 426 and propertied naming context implementation 436 implement substantially all of the recursiveness in methods, e.g., Java™ methods, which are static. That is, the methods implemented by naming context implementation 426 and propertied naming context implementation 436 are not associated with a particular object but are, instead, accessible to any other method which has the required access. In order for an object, such as a server object called by a client, to gain access to a storage mechanism implemented by either actual naming context implementation 428 or actual propertied naming context implementation 438, the object is passed to the static methods in either naming context implementation 426 or propertied naming context implementation. The static methods may then use the methods on the object for local operations.

In the described embodiment, the interfaces associated with naming context data store 430 and propertied naming context data store 440 are the local portions of a name service implementation. That is, the storage mechanisms encapsulated by naming context data store 430 and propertied naming context data store 440 and, hence, embodied by actual naming context implementation 428 and actual propertied naming context implementation 438, are essentially the only portions of a name service implementation which are affected by whether the name service is persistent or transient. Therefore, substantially all of the code associated with name service 420 may generally be shared between persistent and transient implementations.

When an object is to be bound to a name, the name and the object, or an object reference, may be passed into a bind operation as arguments. By way of example, a bind operation that is arranged to bind name "abc" to an object "obj" may have the following form:

bind (<a, b, c>, obj)

In order to bind name "abc" to object "obj," name "abc" is generally first resolved, or looked up. As will be appreciated by those skilled in the art, a bind operation may also be used to bind an object to many other names, such as "def."

Name "abc" has multiple, e.g., three, components. As such, to facilitate the binding of name "abc" to object "obj," components "a" and "b" of name "abc" are resolved, and component "c" of name "abc" is bound to object "obj." As such, bind(<a, b, c>, obj) may essentially be expressed as resolve(<a, b>).bind(<c>, obj). In other words, the first N−1 components of a name may be resolved, and the operation to bind an object to the last component, i.e., component N, of the name may be performed on the result of the resolve operation performed on the first N−1 components of the name. The application of the bind operation, called with the last component of a name, to the result of the resolve operation is generally considered to be a "recursion rule." Specifically, the resolve operation is considered to be the recursive portion of a name service implementation while the bind operation called on the last component of the name is considered to be the "local" portion of the implementation, as will be described below.

This recursion rule with names having multiple components, as described above, applies for substantially all operations associated with a naming context interface, as for example the naming context interface described above with reference to FIG. 4. Code may be shared between both persistent and transient name services by separately dealing with the recursive portion of the name service implementation and the local portion of the name service implementation. That is, the recursive portion of the name service implementation may be shared by both persistent and transient name service implementations, with substantially only the local portion being specific to either a persistent name service implementation or a transient name service implementation.

When a common codebase may be established for use with both a transient name service and a persistent name service, the efficiency with which the transient name service and the persistent name service may be implemented increases. This increase in efficiency is due to the fact that excessive code bloat, which has a tendency to occur when separate, essentially duplicate, sections of code are located within a single program.

Operations, e.g., a bind operation, performed using the name service interface described above with respect to FIG. 4 are generally performed by processing the first N−1 components of a name that is to be bound, then processing the last, or "Nth," component of the name. With reference to FIGS. 5a–5d, the steps associated with performing a bind operation will be described in accordance with an embodiment of the present invention. Typically, when a client wants to bind a name, such as a name "abc," with an object, the client generally sends an invocation request to a server or, more specifically, a server object that is appropriate for binding a name with an object. In the described embodiment, the server object which is the recipient of the invocation request is the server object, or a naming context, that is arranged to perform a bind operation in response to the request from the client.

Performing a bind operation begins at step 502 where a "dobind" method is called by the server object. In one embodiment, the server object calls a naming context implementation, such as naming context implementation 426 of FIG. 4, which is associated with the dobind method. The dobind method, which is essentially arranged to cause a name to be bound either to a context or to an object, may generally be called with a variety of different arguments. The arguments may include, but are not limited to, the server object itself, the name which is to be bound, an object reference which is to be bound, a rebind argument, and a binding type. The name to be bound and the object reference which is to be bound with the name are passed from the client to the server object. In one embodiment, when an object is being bound and not re-bound, the rebind argument may be "false," and the binding type may be an object. In another embodiment, the binding type may be a context.

After the dobind method is called by the server object, then the dobind method checks the name that is to be bound in step 504. The check is typically used to determine whether the name is valid. As will be appreciated by those skilled in the art, any and all parameters, or arguments, in the call to the dobind method may be checked for validity. However, in the described embodiment, the name to be bound is substantially the only parameter which is checked for validity. While checks for validity may be widely varied, a check for validity generally involves a check of the levels, e.g., the number of components, associated with a name.

A determination is made in step 506 regarding whether the name is shorter than a single level. That is, it is determined whether the name "is less than" a first level, or contains less than one component. If the determination is that the name is less than the first level, then the indication is that the name has no levels, i.e., the name is essentially invalid and may not be bound. Accordingly, an exception is thrown to the client in step 508 to indicate that the name passed from the client is invalid, and the process of performing a bind operation is terminated.

Alternatively, if the determination in step 506 is that the name is not less than the first level, then process flow moves to step 510 where it is determined whether the name is equal to the first level, i.e., has only a first level or has only one component. When a name has only one component, then substantially only the local part of the implementation is processed, as there is essentially no recursive part of the implementation. If it is determined that the name is equal to the first level, then a determination is made in step 512 as to whether the argument for rebind is equal to true. Specifically, a determination is made in step 512 regarding whether the rebind argument passed into the call to a dobind method in step 502 is equal to true.

When it is determined that the rebind argument is equal to true, then process flow proceeds to step 514 where an unbind operation is called on the server object itself with the name as an argument. That is, the unbind operation is called by the server object such that the server object itself is the backend in the call. The unbind operation is arranged to unbind the name from the object reference to which the name is already bound. Once the unbind operation is called, a bind operation is called in step 522 on the server object itself with the name and the object, or, more specifically, the object reference passed from the client, as arguments. As will be appreciated by those skilled in the art, in addition to binding a name to an object, a bind operation may be arranged to store the name and the object reference associated with the object into a database or any suitable storage mechanism. By way of example, the bind operation may include standard methods which are used to write a name and an object reference to a non-volatile memory such as a disk. In the described embodiment, the bind operation is associated with a naming context data store interface. After the bind operation is called, the name is bound to the object, and the process of binding a name to an object is completed.

Returning to step 512, if the argument for rebind is not equal to true, i.e., if the argument for rebind is false, then process flow moves to step 516 in which the server object calls a resolve operation on itself. The resolve operation is generally arranged to look up the name, as described above. After the resolve operation is called, a determination is made in step 518 as to whether the name is already bound. If the determination is that the name is already bound, then an exception is thrown to the client in step 520 to indicate that the name is already bound, and the process of performing a bind operation is terminated. On the other hand, if the determination in step 518 is that the name is unbound, then process flow moves to step 522 where a bind operation is called on the server object itself with the name and the object, or object reference, that were passed from the client. The bind operation called on the server object itself is generally implemented by a naming context data store, such as naming context data store 430 of FIG. 4. The specific bind operation that is called on the server object is at least partially dependent upon whether the overall name service is a transient name service or a persistent name service.

With reference back to step 510, if it is determined that the name is neither less than the first level nor equal to the first level, then the indication is that the name is greater than the first level. That is, the indication is that the name has multiple levels or components. As such, the first level of the name is obtained in step 524, and a resolve operation is called on the server object itself with the first level of the name in step 526. Once the resolve operation is called to essentially look up the first level of the name, a determination is made in step 528 regarding whether the first level of the name is bound. If the determination is that the first level is not bound, then an exception is thrown to the client in step 530, and the process of performing a bind operation is terminated.

Alternatively, if the determination in step 528 is that the first level is bound, then in step 532, it is determined if the result of the call to a resolve operation, i.e., the call to the resolve operation in step 526, is a naming context. A naming context, as described above, is typically either an object or a context. A naming context that is an object generally stores a tables of bindings that are object references. If the result of the call to the resolve operation is not a naming context, then an exception is thrown to the client in step 530. Alternatively, if the call to the resolve operation does result in a naming context, then process flow moves from step 532 to step 534, in which all the remaining levels of the name are obtained at once.

After all the remaining levels of the name are obtained, a determination is made in step 536 regarding whether the rebind argument, which was passed as a parameter into the call to the dobind method in step 502, is true. If the rebind argument is true, then the indication is that in the event that the remaining levels of the name are to be rebound if they are already bound. When the rebind argument is true, it is determined in step 538 whether the binding type is a context. For an embodiment in which a binding type is not a context, e.g., the binding type is an object, then a suitable rebind operation is called in step 542 using the result of the resolve operation from step 526. By way of example, for an embodiment in which the binding type is an object, then a rebind object operation may be called with the remaining levels of the name and the object reference that was passed in by the client. The process of performing a bind operation is completed once a suitable rebind operation is called.

If the binding type is determined to be a context in step 538, then a call is made in step 540 to a rebind context operation on the result of the resolve operation from step 526. After the rebind context operation is called, and the context is rebound, then the process of performing a bind operation is completed.

Returning to step 536, if it is determined that the rebind argument is not true, then the indication is that the remaining levels of the name are to be bound, and not rebound. Accordingly, process flow moves from step 536 to step 543 where a determination is made as to whether the binding type is a context. That is, a determination is made regarding whether the binding type parameter passed into the call to the dobind method in step 502 is a context. If the binding type is a context, then in step 544, a call is made to a bind context operation on the result of the resolve operation in step 526, and the process of performing a bind operation is completed. Alternatively, when it is determined in step 543 that the binding type is not a context, then in step 546 an appropriate bind operation is called on the result of the call to a resolve operation from step 526. The bind operation is called with the remaining levels of the name and the object reference which was passed in from the client. Once the appropriate bind operation, as for example a bind operation suitable for an object, is called, the process of performing a bind operation is completed.

Calling the bind operation, as for example in step 546, and calling a rebind operation, as for example in step 542, allows the binding, or association between the name and the object reference, to be stored appropriately. For example, for a transient name service, the implementation of the naming context data store interface, by an actual naming context implementation, essentially writes the binding into memory, e.g., volatile memory. Alternatively, for a persistent name service, the implementation of the naming context data store interface by the actual naming context implementation stores the binding to a file. Hence, in the described embodiment, the steps of calling the bind operation and the rebind operation are "local," in that they are dependent upon whether the name service is persistent or transient, whereas substantially all of the remaining steps associated with performing the bind operation are independent of whether the name service is persistent or transient.

In addition to performing a bind operation, as mentioned above, name service implementations also include a variety of other operations. The operations include a resolve operation, an unbind operation, and a destroy operation. Typically, the general steps associated with each operation are substantially the same. By way of example, the general steps associated with performing a resolve operation are approximately the same as those associated with an unbind operation. That is, while steps associated with looking up a name in order to resolve the name or to unbind the name may be substantially the same. However, specific steps associated with the performance of a resolve operation may be different from the specific steps associated with the performance of an unbind operation.

Figure 6A:
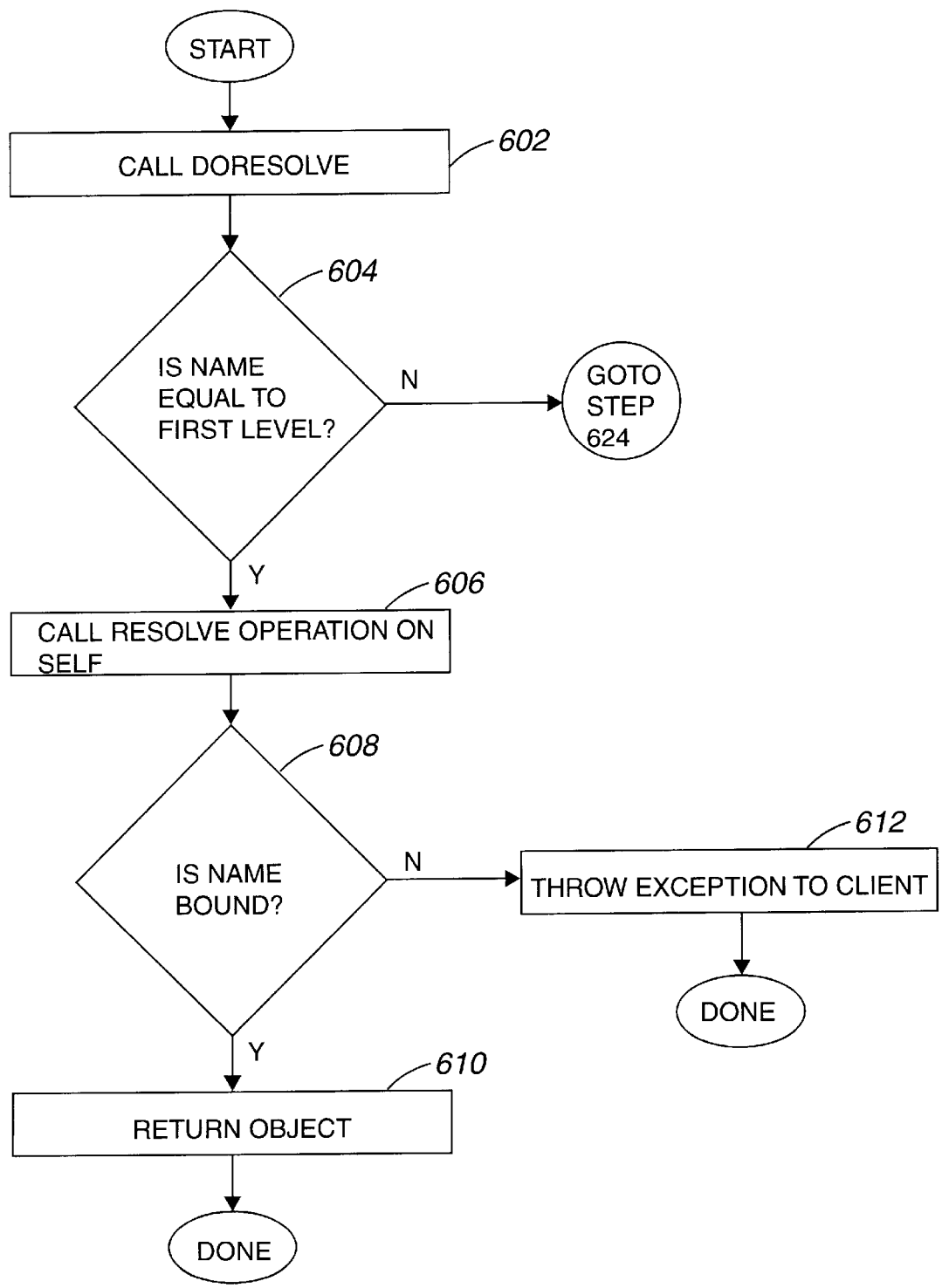
FIGS. 6a and 6b are a process flow diagram which illustrates the steps associated with performing a resolve method in accordance with an embodiment of the present invention.
Figure 6B:
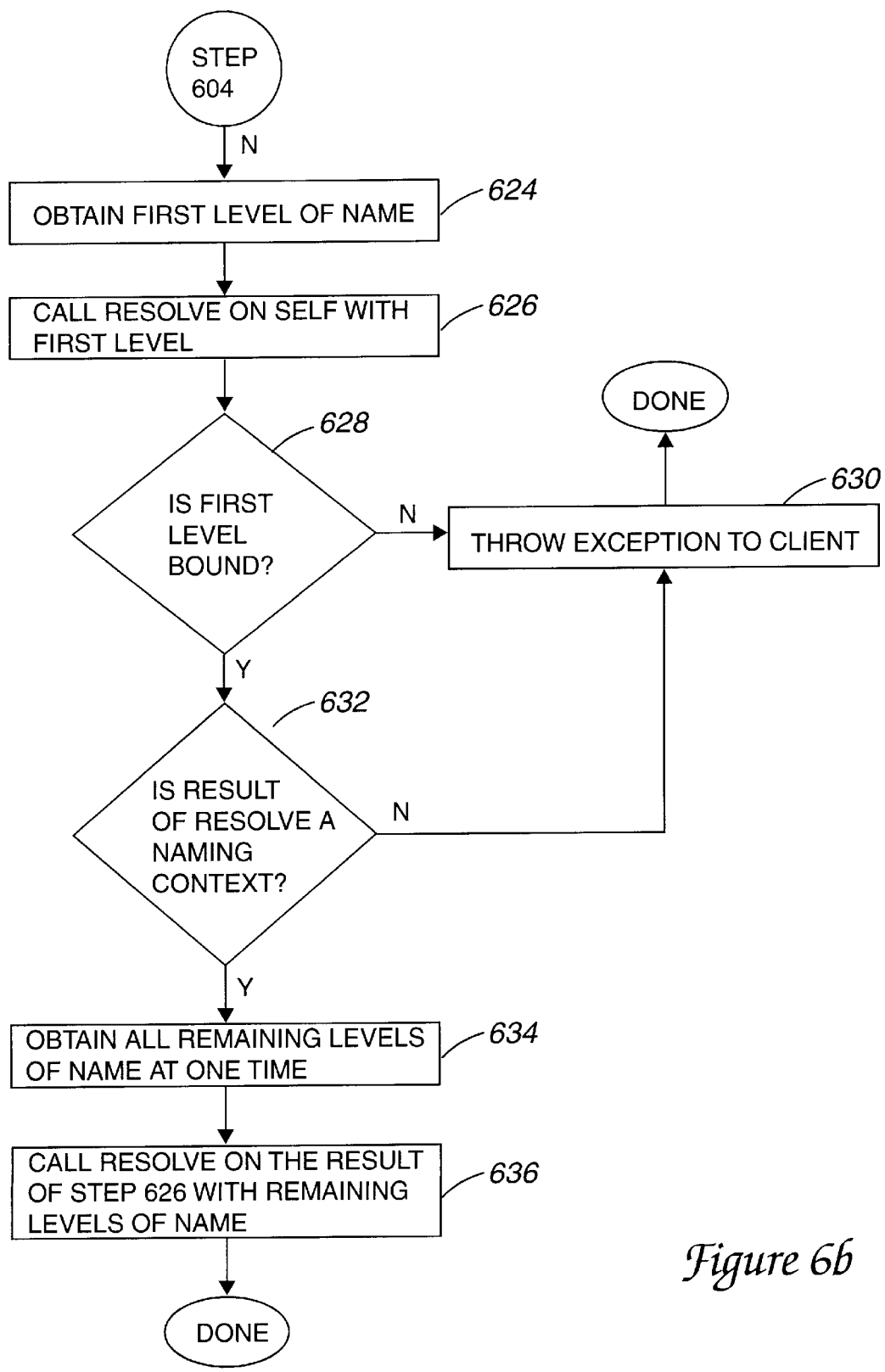

FIGS. 6a and 6b are a process flow diagram which illustrates the steps associated with performing a resolve operation in accordance with an embodiment of the present invention. In one embodiment, a client may provide a server object with a name, and request that the server object invoke a resolve operation to resolve the name using a name service in a system which supports both a transient name service and a persistent name service. The process of performing a resolve operation begins at step 602 in which the server object makes a call to a "doresolve" method. The same doresolve method is called irregardless of whether the name service desired is a transient name service or a persistent name service. In general, like the dobind method described above with respect to FIGS. 5a–5d, a doresolve method may be called substantially with any suitable arguments. While suitable arguments may be widely varied, suitable arguments generally include, but are not limited to, the name that is to be resolved.

After the call to the doresolve method, a determination is made regarding whether the name that is to be resolved is equal to a first level in step 604. That is, a determination is made regarding whether the name has only a single level, or component. If the name is equal to the first level, then in step 606, the server object calls a resolve operation on itself. Once the resolve operation is called, a determination is made in step 608 regarding whether the name that is being resolved is bound. If the name is not bound, then the name may effectively not be resolved. Accordingly, an exception is thrown to the client in step 612, and the process of performing a resolve operation is terminated. Alternatively, if it is determined in step 608 that the name is bound, then the implication is that the name has been resolved in step 606. As such, process flow moves from step 608 to step 610 where the object that is associated with the name is returned. Once the object is returned, the process of performing a resolve operation to identify the object associated with the name is completed.

Referring back to step 604, if the determination is that the name is not equal to the first level, then the indication is that the name is greater than the first level, since, in the described embodiment, a name may not be less than the first level. That is, any name that is less than the first level is invalid in that the name has no components. Therefore, process flow moves from step 604 to step 624 where the first level of the name is obtained. Once the first level of the name is obtained, the server object makes a call to a resolve method on itself with the first level of the name as an argument in step 626. In general, the call to the resolve method is made in order to resolve the first level of the name. The resolve method that is called is a local method and, hence, the actual resolve method that is called is associated with a naming context data store, as shown in FIG. 4, and is dependent upon whether the associated name service is transient or persistent.

Once the resolve method is called in step 626, a determination is made in step 628 as to whether the first level is bound. If the first level is not bound, then process flow moves to step 630 where an exception is thrown to the client. The exception typically indicates that the name may essentially not be resolved. The performance of a resolve operation is essentially completed once the exception is thrown to the client.

Alternatively, if it is determined in step 628 that the first level is bound, then in step 632, a determination is made regarding whether the result of a call to the resolve method is a naming context. If the result of the resolve method is not a naming context, an exception is thrown to the client in step 630. Once the exception is thrown, the process of performing a resolve operation is effectively completed.

When the determination in step 632 is that the result of the resolve method is a naming context, then process flow moves to step 634 where all remaining levels of the name are obtained at substantially the same time. After the remaining levels are obtained, a resolve method is called on the naming context obtained in step 626 with the remaining levels of the name to resolve the remaining levels of the name. Once the remaining levels of the name are resolved, the process of performing a resolve operation is completed.

Figure 7:
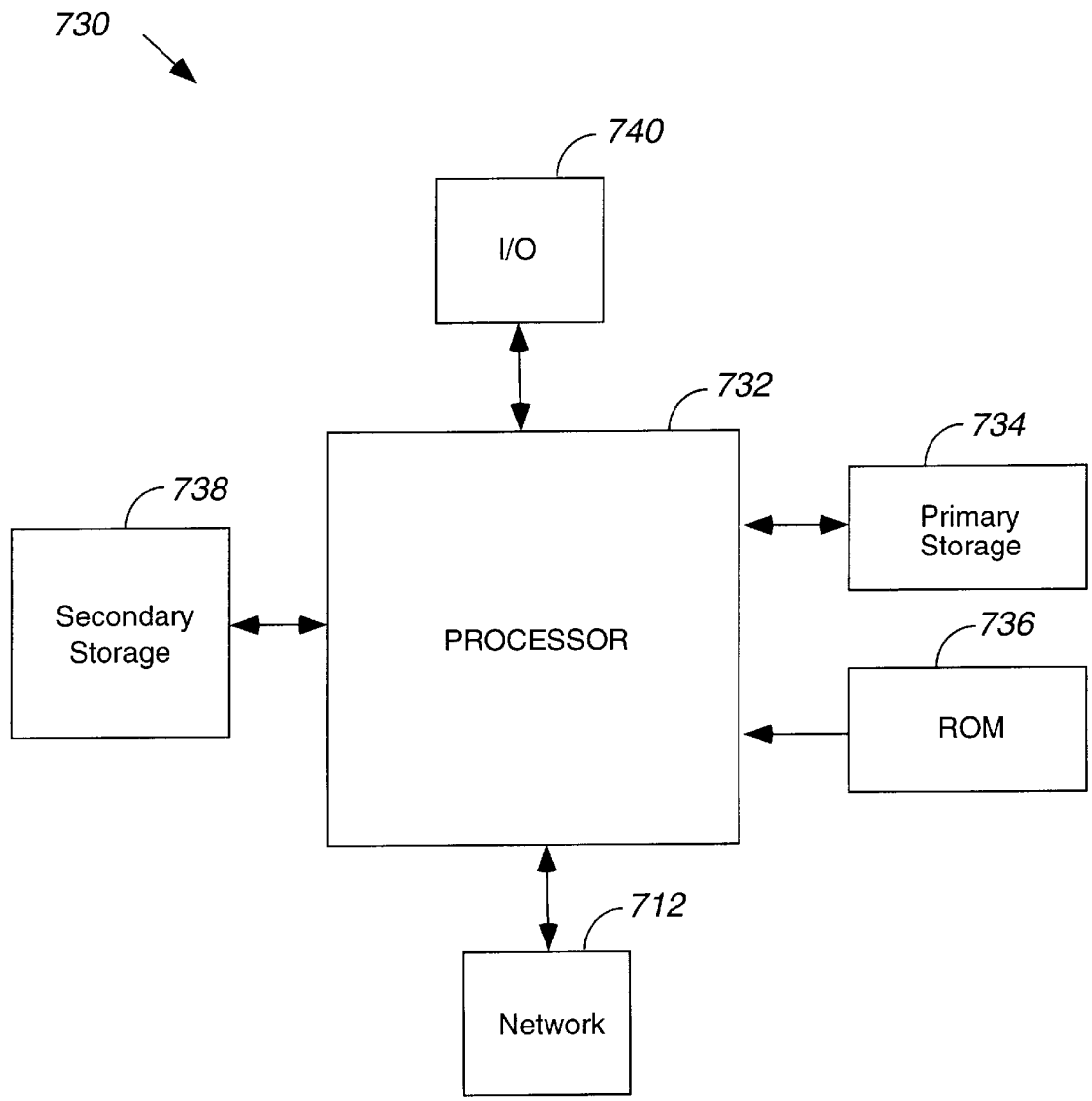
FIG. 7 is a diagrammatic representation of a computer system suitable for implementing the present invention.

A name service as described above may generally be implemented on a variety of different computer systems. FIG. 7 illustrates a typical, general-purpose computer system suitable for implementing the present invention. The computer system 730 includes a processor 732 (also referred to as a central processing units, or CPU) that is coupled to memory devices including primary storage devices 736 (typically a read only memory, or ROM) and primary storage devices 734 (typically a random access memory, or RAM).

In one embodiment, computer system 730 or, more specifically, CPU 732, may be arranged to support a virtual machine, as will be appreciated by those skilled in the art. One example of a virtual machine that is supported on computer system 730 is a Java™ virtual machine. The operation of virtual machines or, more particularly, Java™ virtual machines, is described in *The Java™ Virtual Machine Specification* by Tim Lindholm and Frank Yellin (ISBN 0-201-63452-X), which is incorporated herein by reference.

As is well known in the art, ROM acts to transfer data and instructions uni-directionally to CPU 732, while RAM is used typically to transfer data and instructions in a bi-directional manner. Both storage devices 734, 736 may include any suitable computer-readable media. A secondary storage medium 738, which is typically a mass memory device, is also coupled bi-directionally to CPU 732 and provides additional data storage capacity. The mass memory device 738 is a computer-readable medium that may be used to store programs including computer code, data, and the like. Typically, mass memory device 738 is a storage medium such as a non-volatile memory such as a hard disk or a tape which generally slower than primary storage devices 734, 736. Mass memory storage device 738 may take the form of a magnetic or paper tape reader or some other well-known device. It will be appreciated that the information retained within the mass memory device 738, may, in appropriate cases, be incorporated in standard fashion as part of RAM 736 as virtual memory. A specific primary storage device 734 such as a CD-ROM may also pass data uni-directionally to the CPU 732.

CPU 732 are also coupled to one or more input/output devices 740 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 732 optionally may be coupled to a computer or telecommunications network, e.g., an internet network, or an intranet network, using a network connection as shown generally at 712. With such a network connection, it is contemplated that CPU 732 might receive information from the network, or might output information to the network in the course of performing the above-described method steps. Such information, which is often represented as a sequence of instructions to be executed using CPU 732, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on CPU 732 and other CPUs, as for example a CPU which is in communication with CPU 732 across network connection 712. Specifically, the above-described method steps may be performed across a computer network.

Although only a few embodiments of the present invention have been described, it should be understood that the present invention may be embodied in many other specific forms without departing from the spirit or the scope of the present invention. By way of example, the steps associated with performing bind operations and resolve operations may generally be reordered, added, and removed. For instance, the performance of a resolve operation may include a validity check to determine whether the name that is being resolved in valid. Similarly, some or all of the arguments used in the performance of a bind operation, e.g., arguments passed into a call to a dobind method, may also be checked for validity without departing from the spirit or the scope of the present invention.

Additionally, it should be appreciated that the data storage mechanisms, or data stores, used to store bindings may also be widely varied. Data storage mechanisms may generally include computer hard drives and tape drives. Further, data storage mechanisms may be located anywhere within a computer network.

The structure of a naming context data store interface, e.g., the naming context data store interface shown generally in FIG. 4, may vary depending upon the requirements of a particular system. The number and structure of the classes extended by a naming context implementation base may be varied to include fewer or more classes. For example, in one embodiment, the functionality of both a naming context implementation and the actual naming context implementation may essentially be combined into a single class without departing from the spirit or the scope of the present invention.

Further, although a name service has been described in terms of including the ability to store properties, it should be appreciated that in one embodiment, a name service may include only the ability to store bindings between names and objects. Therefore, the present examples are to be considered as illustrative and not restrictive, and the invention is not to be limited to the details given herein, but may be modified within the scope of the appended claims along with their full scope of equivalents.

What is claimed is:

1. A computer-implemented method for implementing at least one storage mechanism for a name service, the method comprising:

creating a name service, the name service being arranged to store both transient information and persistent information, wherein the at least one storage mechanism is arranged to store the persistent information;

creating a recursive section of a hierarchical name space structure, wherein the recursive section is arranged to process both the transient information and the persistent information; and creating a local section of the hierarchical name space structure, the local section including an implementation that embodies the at least one storage mechanism arranged to store the persistent information, wherein the at least one storage mechanism is encapsulated in a data store interface.

2. A computer-implemented method as recited in claim 1 wherein the local section is further arranged to store the transient information.

3. A computer-implemented method as recited in claim 2 wherein binding the name passed into the name service to the type passed into the name service includes the steps of:

binding the name to the type when it is determined that the number of components in the name has a single component;

obtaining a first component in the name when it is determined that the number of components in the name has multiple components;

resolving the first component of the name; and obtaining remaining components of the name after the first component of the name is resolved to bind the name to the type.

4. A computer-implemented method as recited in claim 2 wherein the local section is arranged to perform at least one of a resolve operation and a destroy operation on a name passed into the name service.

5. A computer-implemented method as recited in claim 2 wherein the local section is arranged to perform at least one of a rebind operation or an unbind operation on a name passed into the name service and a type passed into the name service.

6. A computer-implemented method as recited in claim 1 wherein the local section is arranged to bind a name passed into the name service to a type passed into the name service.

7. A computer-implemented method as recited in claim 6 wherein the type is at least one of an object and a context.

8. A computer-implemented method for implementing a name service in an object-based computing system, the computer-implemented method comprising:

providing a context interface associated with the name service, the name service being arranged to allow object references to be traversed recursively, wherein the context interface is arranged to implement a class, the class being arranged to perform data storage of both transient data and persistent data; and providing a storage interface associated with the context interface to implement the class.

9. A computer-implemented method as recited in claim 8 wherein the storage interface is arranged to encapsulate at least one data store.

10. A computer-implemented method as recited in claim 8 wherein the storage interface includes a bind operation, the method further including:

providing a name to the context interface;

providing an object to the context interface, wherein the object is to be bound to the name with a binding; and storing the binding between the object and the name, wherein the binding is at least partially stored in the data store embodied in the class.

11. A computer-implemented method as recited in claim 10 further including storing a property in the data store, wherein the property is associated with the name.

12. A computer-implemented method as recited in claim 8 wherein the storage interface includes a resolve operation, the method further including:

providing a name to the context interface; and resolving the name by obtaining a binding from a data store embodied in the class which is arranged to perform data storage, the binding being associated with the name.

13. A computer-implemented method for binding a name to an object reference associated with a server object in a name service, the method comprising:

obtaining a first component of the name when the name has more than a single component and includes at least one remaining component;

determining whether the first component of the name is bound;

resolving the server object using the first component of the name;

obtaining the at least one remaining component of the name, wherein the at least one remaining component of the name is obtained through a naming context object; and processing the at least one remaining component to bind the resolved server object with the name.

14. A method as recited in claim 13 wherein when the name does not have more than one component, the method further includes calling a bind operation on the server object to bind the name to the object reference.

15. A method as recited in claim 13 further including determining whether a binding type associated with the object reference is a context.

16. A name service within a computer system, the name service being arranged to store both transient information and persistent information, wherein at least one storage mechanism is arranged to store the persistent information, the name service comprising:

a recursive section of a hierarchical name space structure, wherein the recursive section of the hierarchical name space structure is arranged to process both the transient information and the persistent information; and a local section of the name space structure, the local section including an implementation that embodies the at least one storage mechanism arranged to store the persistent information, wherein the at least one storage mechanism is encapsulated in a data store interface.

17. A name service within a computer system as recited in claim 16 wherein the local section is further arranged to store the transient information.

18. A name service within a computer system as recited in claim 17 wherein the local section is arranged to bind a name passed into the name service to a type passed into the name service.

19. A name service within a computer system as recited in claim 18 wherein the type is one of an object and a context.

20. A computer system arranged to implement at least one storage mechanism for a name service, the name service being arranged to store both transient information and persistent information, wherein the at least one storage mechanism is arranged to store the persistent information, the computer system comprising:

a processor;

a data store interface; and a hierarchical name space structure including a recursive section and a local section, the recursive section of the name space structure being arranged to process both the transient information and the persistent information, the local section including an implementation that embodies the at least one storage mechanism arranged to store the persistent information, wherein the at least one storage mechanism is encapsulated in the data store interface.

21. A computer system as recited in claim 20 wherein the local section is further arranged to store the transient information.

22. A computer system as recited in claim 21 wherein the local section is arranged to bind a name passed into the name service to a type passed into the name service.

23. A computer system as recited in claim 22 further including:

a binding mechanism arranged to bind the name to the type when the name has a single component; and a resolver for resolving a first component of the name when the name has more a plurality of components.

24. A computer program product for implementing at least one storage mechanism for a name service, the computer program product comprising:

computer code that creates a name service, the name service being arranged to store both transient information and persistent information, wherein the at least one storage mechanism is arranged to store the persistent information;

computer code that creates a recursive section of a hierarchical name space structure, wherein the recursive section of the hierarchical name space structure is arranged to process both the transient information and the persistent information;

computer code that creates a local section of the name space structure, the local section including an implementation that embodies the at least one storage mechanism arranged to store the persistent information, wherein the at least one storage mechanism is encapsulated in a data store interface; and a computer readable medium that stores the computer codes.

25. A computer program product as recited in claim 24 wherein the computer code that creates the local section further includes computer code that is arranged to store the transient information, the computer code that creates the local section further being arranged to bind a name passed into the name service to a type passed into the name service.

26. A computer program product as recited in claim 25 further including:

computer code that binds the name to the type when the name has only a single component;

computer code that obtains a first component in the name when the name has multiple components;

computer code that resolves the first component of the name; and computer code that obtains remaining components of the name after the first component of the name is resolved to bind the name to the type.

27. A computer program product as recited in claim 24 wherein the computer readable medium is a code representation embodied in a carrier wave.

* * * * *